US012732558B2

(12) United States Patent
Kunnumpurath Jacob et al.

(10) Patent No.: US 12,732,558 B2
(45) Date of Patent: Sep. 8, 2026

(54) INTELLIGENT PLANE NETWORK FUNCTIONS FOR GENERATING AND SHARING DATA ACROSS APPLICATIONS AND NETWORK FUNCTIONS

(71) Applicant: Telefonaktiebolaget LM Ericsson (publ), Stockholm (SE)

(72) Inventors: Arun Mathew Kunnumpurath Jacob, Leixlip (IE); Ashwin Raghavan, Athlone (IE); James O'Meara, Athlone (IE); Mats Blomgren, Stockholm (SE); Premnath Kandhasamy Narayanan, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 18/718,556

(22) PCT Filed: Dec. 15, 2021

(86) PCT No.: PCT/EP2021/085938
§ 371 (c)(1),
(2) Date: Jun. 11, 2024

(87) PCT Pub. No.: WO2023/110084
PCT Pub. Date: Jun. 22, 2023

(65) Prior Publication Data

US 2025/0047743 A1 Feb. 6, 2025

(51) Int. Cl.
*G06F 15/16* (2006.01)
*G06F 40/177* (2020.01)
(Continued)

(52) U.S. Cl.
CPC ........ *H04L 67/1097* (2013.01); *G06F 40/177* (2020.01); *H04L 41/12* (2013.01)

(58) Field of Classification Search
CPC ............................ H04L 67/1097; H04L 41/12
See application file for complete search history.

(56) References Cited

U.S. PATENT DOCUMENTS

2004/0172590 A1* 9/2004 Rothschiller ......... G06F 40/166 715/236
2015/0379428 A1* 12/2015 Dirac ..................... G06N 20/00 706/12

(Continued)

FOREIGN PATENT DOCUMENTS

CN 109299200 A 2/2019
EP 1452974 A2 9/2004

OTHER PUBLICATIONS

International Search Report and Written Opinion of the International Searching Authority, PCT/EP2021/085938, mailed Jul. 21, 2022, 14 pages.

(Continued)

*Primary Examiner* — Yves Dalencourt
(74) *Attorney, Agent, or Firm* — Sage Patent Group

(57) ABSTRACT

A method by a network function of a wireless communication system includes receiving structured non-tabular data relating to the wireless communication system, wherein the structured non-tabular data includes network topology data in graph format. The structured non-tabular data is converted into tabular data. Converting the structured non-tabular data into tabular data includes identifying a baseline object of a graph of the network topology data and generating a row of tabular data for each baseline object in the graph of the network topology data. The method further includes storing the tabular data in a data store for access by consumer applications in the wireless communication system.

21 Claims, 14 Drawing Sheets

(51) Int. Cl.

| | |
|---|---|
| ***H04L 41/12*** | (2022.01) |
| ***H04L 67/1097*** | (2022.01) |

(56) References Cited

U.S. PATENT DOCUMENTS

| | | | | |
|---|---|---|---|---|
| 2019/0095599 | A1* | 3/2019 | Iliofotou | G06F 16/337 |
| 2019/0374282 | A1* | 12/2019 | Tegg | A61B 34/20 |
| 2023/0237040 | A1* | 7/2023 | Thompson | G06V 30/414<br>382/159 |
| 2025/0217054 | A1* | 7/2025 | Kant | G06F 3/0673 |

OTHER PUBLICATIONS

Yaghmazadeh et al. “Automated migration of Hierarchical Data to Relational Tables using Programming-by-Example,” Proceedings of the VLDB Endowment; Assoc. of Computing Machinery, New York, New York, Jan. 1, 2018, 14 pages.

* cited by examiner

42C

| Network in a Row | | | | |
|---|---|---|---|---|
| Date | Baseline Object | Feature 1 | Feature 2 | Feature 3 (App1 output) |
| | | | | |

Final merged data

Deployment view in Cloud (Central Location)

- NRQ/NRT running as sidecar containers
- App1 and App2 are applications requiring Network in a Row data Deployment view for Far Edge (e.g., eNodeB)

| Node ID | Node_Param1 | Node_Param2 | Node_Param3 | Node_Param4 |
|---|---|---|---|---|
| N1 | 25 | 32,2,1 | Shannon | 9 |

| Node ID | Cell_Name | Cell_Param1 | Cell_Param2 | Cell_Param3 |
|---|---|---|---|---|
| N1 | cell1 | 32 | 10,134,32 | 12 |
| N1 | cell2 | 33 | 14,4 | 32 |
| N1 | cell3 | 34 | 4 | 5 |
| N1 | cell4 | 35 | 6 | 32 |

| Node_Param2_1 | Node_Param2_2 | Node_Param2_3 |
|---|---|---|
| 32 | 2 | 1 |

| Node ID | Node_Param1 | Node_Param2 | Node_Param3 | Node_Param4 |
|---|---|---|---|---|
| N1 | 25 | 32,2,1 | Shannon | 9 |

| Node ID | Cell_Name | Cell_Param1 | Cell_Param2 | Cell_Param3 |
|---|---|---|---|---|
| N1 | cell1 | 32 | 10,134,32 | 12 |
| N1 | cell2 | 33 | 14,4 | 32 |
| N1 | cell3 | 34 | 4 | 5 |
| N1 | cell4 | 35 | 6 | 32 |

| Cell_Param2_1_cell1 | Cell_Param2_2_cell1 | Cell_Param2_3_cell1 | Cell_Param2_1_cell2 | Cell_Param2_2_cell2 | Cell_Param2_1_cell3 | Cell_Param2_1_cell4 |
|---|---|---|---|---|---|---|
| 10 | 134 | 32 | 14 | 4 | 4 | 6 |

48

| Node ID | Node_Param1 | Node_Param2_1 | Node_Param2_2 | Node_Param2_3 | Node_Param3 | Node_Param4 |
|---|---|---|---|---|---|---|
| N1 | 25 | 32 | 2 | 1 | Shannon | 9 |

| Cell_Param1_cell1 | Cell_Param1_cell2 | Cell_Param1_cell3 | Cell_Param1_cell4 | Cell_Param2_1_cell1 | Cell_Param2_1_cell2 | Cell_Param2_1_cell3 |
|---|---|---|---|---|---|---|
| 32 | 33 | 34 | 35 | 10 | 14 | 4 |

| Cell_Param2_1_cell4 | Cell_Param2_2_cell1 | Cell_Param2_2_cell2 | Cell_Param2_3_cell1 | Cell_Param3_cell1 | Cell_Param3_cell2 | Cell_Param3_cell3 |
|---|---|---|---|---|---|---|
| 6 | 134 | 4 | 32 | 12 | 32 | 5 |

| Cell_Param3_cell4 | Cell_Name_cell1 | Cell_Name_cell2 | Cell_Name_cell3 | Cell_Name_cell4 |
|---|---|---|---|---|
| 32 | cell1 | cell2 | cell3 | cell4 |

FIGURE 10

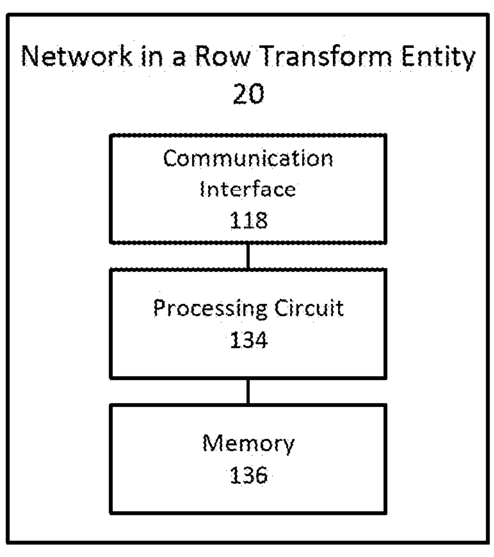
FIGURE 15A
Memory
136
Data Collection Module
122
Data Transformation Module
124
FIGURE 15B
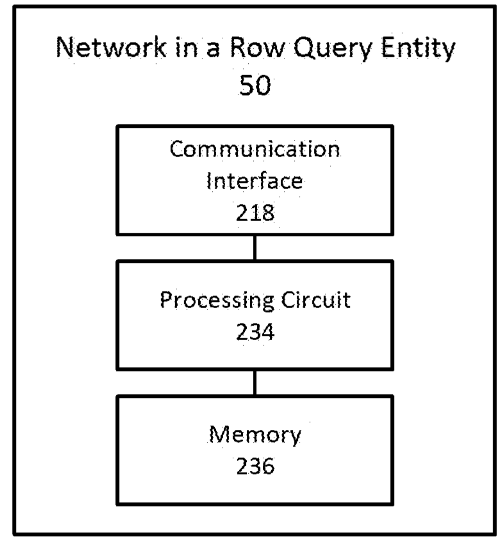
FIGURE 16A
Memory
236
Query Processing Module
222
Data Retrieval Module
224
FIGURE 16B

INTELLIGENT PLANE NETWORK FUNCTIONS FOR GENERATING AND SHARING DATA ACROSS APPLICATIONS AND NETWORK FUNCTIONS

CROSS REFERENCE TO RELATED APPLICATIONS

This application is a 35 U.S.C. § 371 national stage application of PCT International Application No. PCT/EP2021/085938 filed on Dec. 15, 2021, the disclosure and content of which is incorporated by reference herein in its entirety.

TECHNICAL FIELD

The present disclosure relates to wireless communication networks. In particular, the present disclosure relates to systems and methods for generating and sharing data across applications in a wireless communication network.

BACKGROUND

The management of a telecommunication network involves the collection and processing of significant amounts of data. Such a volume of data may be effectively processed using machine learning (ML) techniques. The data may be generated or collected across the network by network nodes, user equipment, network functions, and other elements. Telecommunication network data is available in heterogeneous formats, such as binary files, graph data, and text files. Some of the data may be available in specific formats, such as XML (Extensible Markup Language) and YAML (Yet Another Markup Language) files. These data files may be processed using respective parsers and presented in a normalized format, such as with a master-child relationship.

Network topology data in particular is hierarchical, and there are cordiality relations between parent and child. As an example, a base station, such as an eNodeB in a Long Term Evolution (LTE) communication system, can have up to 32 cells, and each cell can have up to 512 neighbor relations. Currently, when collecting data for a one-to-many relationship such as a node-cell relationship, multiple child records may be aggregated into a single record by applying mathematical formulas, such as sum, average for numerical columns or concatenation of values for string, object, and structure columns, to reduce the dimensionality of the data. The aggregated data may be organized into a single cell instance or row instance for inclusion in a table that can be efficiently processing using ML techniques.

Each application in the telecommunication system may repeat these transformation operations and duplicate the transformed data in their own internal storage. This approach may be cumbersome and duplicative, and may not efficiently scale with network size.

SUMMARY

A method by a network function of a wireless communication system according to some embodiments includes receiving structured non-tabular data relating to the wireless communication system, wherein the structured non-tabular data includes network topology data in graph format. The structured non-tabular data is converted into tabular data. Converting the structured non-tabular data into tabular data includes identifying a baseline object of a graph of the network topology data and generating a row of tabular data for each baseline object in the graph of the network topology data. The method further includes storing the tabular data in a data store for access by consumer applications in the wireless communication system.

In some embodiments, converting the structured non-tabular data into tabular data includes converting the structured non-tabular data into flat tabular data.

In some embodiments, the structured non-tabular data is received in a native data format, and wherein the method further includes parsing the structured non-tabular data in the native data format. Parsing the structured non-tabular data may include parsing the structured non-tabular data using an extract, transform and load architecture. In some embodiments, parsing the structured non-tabular data includes parsing the structured non-tabular data using an extract, load and transform architecture.

The structured non-tabular data may include at least one of network topology data, historical data, streaming data, trace file data and application programming interface, API, data.

The method may further include identifying parameters of the baseline objects, identifying related objects associated with the baseline objects, and identifying parameters of the related objects. The parameters of the baseline object and the parameters of the related objects may be included as columns of the tabular data in rows associated with the baseline objects.

The method may further include identifying vector parameters of the baseline objects and related objects, and expanding the vector parameters into a plurality of scalar parameters, wherein the scalar parameters are included as columns of the tabular data in rows associated with the baseline objects.

The network function may be deployed together with the consumer application within a virtual container. In some embodiments, the network function may be deployed as a function-as-a-service that is accessible by the consumer application. In some embodiments, the network function is deployed as a network edge function in the wireless communication system. In particular, the network function may be deployed in a base station of the wireless communication system.

The structured non-tabular data may include first structured non-tabular data and the tabular data may include first tabular data, and the method may further include receiving second structured non-tabular data from a third network function, converting the second structured non-tabular data into second tabular data, and storing the second tabular data in the data store as combined data with the first tabular data.

A network in a row transform, NRT, entity, includes a communication interface, a processing circuit, and a memory that stores computer program instructions that, when executed by the processing circuit, cause the NRT entity to perform operations including receiving structured non-tabular data relating to a wireless communication system. The structured non-tabular data comprises network topology data in graph format. The operations further include converting the structured non-tabular data into tabular data. Converting the structured non-tabular data into tabular data comprises identifying a baseline object of a graph of the network topology data and generating a row of tabular data for each baseline object in the graph of the network topology data. The operations further include storing the tabular data in a data store for access by consumer applications in the wireless communication system.

A computer program product according to some embodiments includes a non-transitory storage medium containing computer program instructions that, when executed by one or more processors of a computing device cause the computing device to perform operations including receiving structured non-tabular data relating to a wireless communication system. The structured non-tabular data comprises network topology data in graph format. The operations further include converting the structured non-tabular data into tabular data. Converting the structured non-tabular data into tabular data comprises identifying a baseline object of a graph of the network topology data and generating a row of tabular data for each baseline object in the graph of the network topology data. The operations further include storing the tabular data in a data store for access by consumer applications in the wireless communication system.

Embodiments described herein may provide certain advantages. For example, by employing the NRT and NRQ functionality described herein, data produced by one application can be made available for other applications within the network ecosystem in a NIR format that is suitable for use by AI/ML applications. The NIR data may be stored in a feature store that is accessible by other applications that use AI/ML algorithms. Performing the NIR transformation in a central entity may avoid having to duplicate the data transformation operations across multiple network functions. Moreover, duplication of data storage and transformation may be avoided by persisting only the changed values once a baseline table has been created.

BRIEF DESCRIPTION OF THE DRAWINGS

FIG. 10 illustrates transformed NIR data according to an example when the baseline object is at node level.

FIG. 15A is a block diagram of an NRT entity according to some embodiments.

FIG. 15B illustrates various functional modules that may be stored in the memory of the NRT entity.

FIG. 16A is a block diagram of an NRQ entity according to some embodiments.

FIG. 16B illustrates various functional modules that may be stored in the memory of the NRQ entity.

DETAILED DESCRIPTION OF EMBODIMENTS

Figure 1:
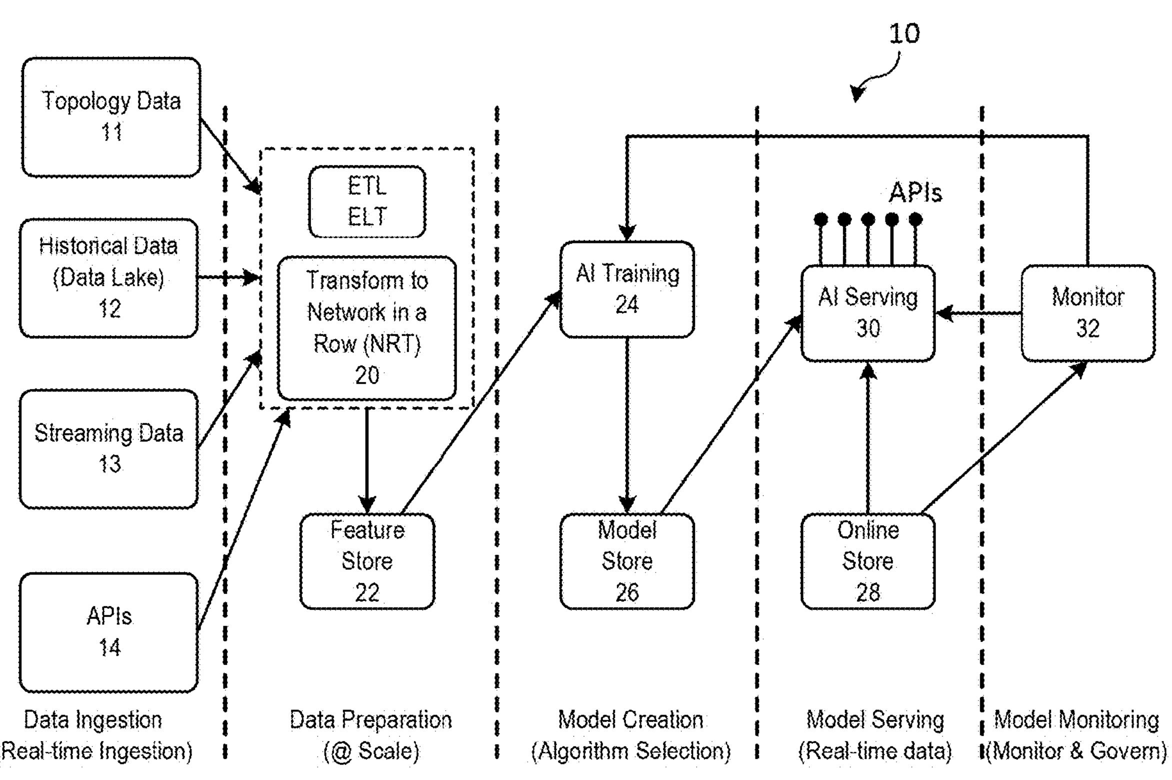
FIG. 1 is a functional block diagram illustrating operations of a system that may incorporate embodiments described herein.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As noted above, data relating to a telecommunications network may be heterogenous in nature and not generally suitable for machine learning processing without using manipulations that may reduce the dimensionality of the data.

Because of the nature of telecommunications network data, AI/ML algorithms may have difficulty processing local instance specific data. This is due to a number of reasons. For example, aggregated data for child objects (e.g.: relations for a cell or cells within an eNodeB) may not have local instance values (e.g.: relation specific values) when the data is aggregated at cell level. Also array and structure data may not be available as individual features for machine learning algorithms.

The conventional approach has other drawbacks. For example, transformation operations may be repeated across network applications, and there is no common network function that can perform these activities. Moreover, applications in the network may not inherently share data, and they may use application specific native interfaces (e.g.: REST) for accessing data.

Additionally, configuration management (CM), Performance Management (PM), Fault Management (FM) and other telecommunication network data may be available as separate entities (e.g., as a set of normalized tables).

Accordingly, some embodiments described herein provide two new network functions, namely, the Network-in-a-row transformer function (NRT) and the Network-in-a-row query engine function (NRQ) that can help address one or more of these issues.

NRT can consume data from other network functions, network elements, applications and perform transformations of the data to an AI/ML algorithm friendly format.

NRQ can make the AI/ML algorithm friendly data inherently available for all registered (or subscribed or attached) applications in network functions or other network elements.

Some embodiments described herein provide a network function (i.e., the NRT) that can perform transformations from graph data (e.g., topology data and other heterogeneous format data) to tabular data that can be efficiently processed by an AI/ML algorithm. And this network function can be deployed in a "side car" container as a global common network function, that helps applications deployed in a Service Management and Orchestration (SMO) or cloud native environment.

Other applications in the system can consume the network in a row data and or produce additional columns as tabular data (or "Network in a row" tabular data). Such "network in a row", or NIR, data can be consumed by AI/ML algorithms that operate in an "Intelligent Plane" of a wireless communication network.

An NRT or NRQ function as described herein may provide certain advantages. For example, the NRT or NRQ function may be deployed as side car container along with an application that utilizes the function, or may run in a dedicated pod in a cloud computing environment.

The NRT network function can also transform the incoming input data to tabular data if the data is not yet transformed.

Network in a row data may be made available in a storage, such as a "Feature Store" that helps all AI/ML algorithms to consume data from a single source of truth, rather than running the transformation pipeline every time, thereby avoiding duplication.

Some embodiments provide different methods for transforming data with higher cardinality when compared to baseline object data. For example, in a telecommunications network baseline object data may correspond to a "Cell" while higher cardinality data may correspond to "Cell Relations". Similarly, baseline object data may correspond to an "eNodeB" while higher cardinality data corresponds to a "Cell". Different data types, such as arrays, and structures may be converted into tabular data for ease of consumption by AI/ML algorithms using similar techniques.

FIG. 1 is a functional block diagram illustrating operations of a system 10 that may incorporate embodiments described herein. As shown therein, the operations of a system 10 that employs NRT/NRQ functionality as described herein may be divided into a number of phases, including a data ingestion phase, a data preparation phase, a model creation phase, a model serving phase, and a model monitoring phase. In the data ingestion phase, heterogeneous data relating to a communication network is collected from various sources within the network, including network topology data 11 that describes logical arrangements of network elements, historical data 12 that may be stored in a data lake, streaming data 13 (such as data in XML or YAML format) and data 14 collected through the use of application programming interfaces (APIs), such as trace file data. The collected data may be in a non-tabular form, such as graph or hierarchical form, that is not suitable for processing using AI/ML or similar algorithms.

In the data preparation phase, the incoming data is converted to a tabular form that is suitable for processing using AI/ML or similar algorithms. In particular, some embodiments provide an NRT entity 20 that can convert the non-tabular data to network-in-a-row (NIR) data that can be easily processed using AI/ML algorithms. In particular, the NRT may convert the non-tabular data to flat tabular data in which individual objects, referred to as baseline objects, are represented by a single row of data. The converted data is stored in a feature store 22 that is accessible to an AI training entity 24 in the model creation phase.

As shown in FIG. 1, the NRT entity 20 may employ an extract-transform-load (ETL) or an extract-load-transform (ELT) approach to storing the NIR data. In an ETL approach, ingested data is transformed before being stored in the feature store. In an ELT approach, ingested data is stored in the feature store in a raw format and transformed when it is retrieved from the feature store.

In the model creation phase, an AI/ML model is trained using transformed data obtained from the NRT entity 20 via the feature store 22. The trained model is stored in a model store 26 that is accessible by an AI serving entity 30 in the model serving phase. The model serving phase may process real-time data stored in an online data store 28. Output of the AI serving entity 30 is made available to network functions and other network entities through APIs.

In the model monitoring phase, a monitoring entity 32 monitors the operation of the AI serving entity 30 and may govern the operation of the AI serving entity 30. For example, the monitoring entity 32 may monitor the accuracy of the AI serving entity 30 and cause the AI/ML model(s) employed by the AI serving entity 30 to be re-trained if the accuracy falls below a threshold level.

During the "Model Creation" and "Model Serving" phases, AI/ML models consume network data in a tabular format that is collected from a feature store 22 (which may be offline) and a feature store 28, respectively, that makes data available in NIR format.

Figure 2:
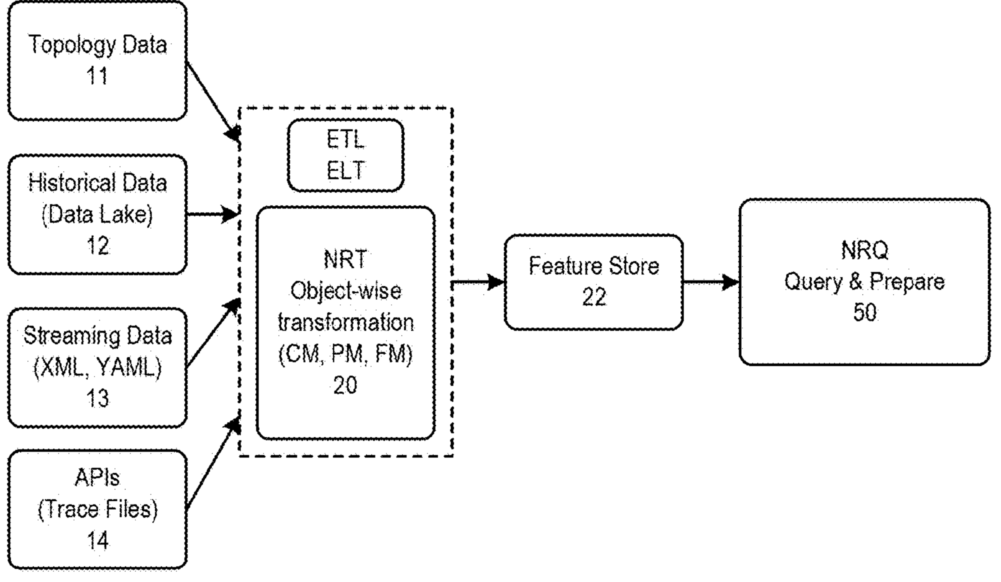
FIG. 2 is a block diagram that illustrates the relationship between the NRT entity and the NRQ entity.

FIG. 2 illustrates the relationship between the NRT entity 20 and the NRQ entity 50. The NRQ entity 50 is a network function that exchanges data between other applications, network functions and network elements. As shown in FIG. 2, ingested data is transformed by the NRT entity 20 to object-wise NIR data, which may include configuration management (CM), Performance Management (PM), and/or Fault Management (FM) data. The NIR data is stored in a feature store 22 from which it can be queried by the NRQ entity 50.

Figure 3:
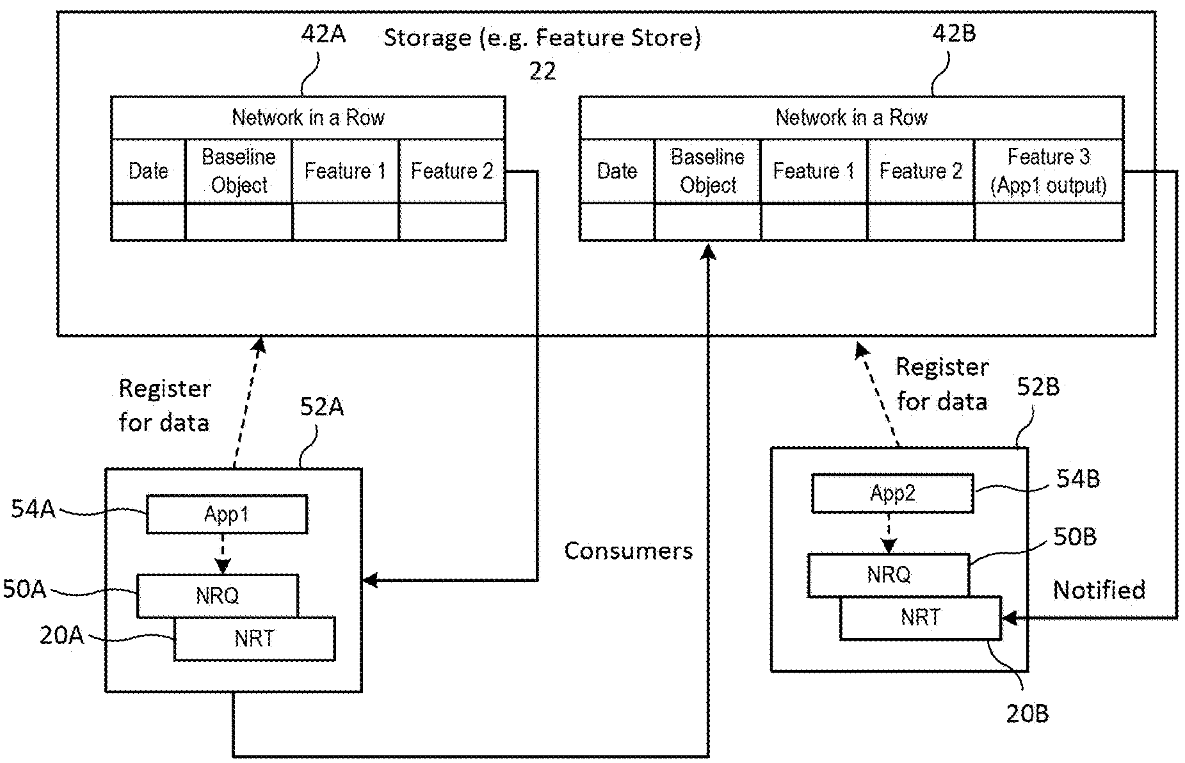
FIG. 3 is a block diagram that illustrates consumption of data from the feature store by consumer entities within the network.

FIG. 3 illustrates consumption of data from the feature store 22 by consumer entities 54A, 54B within the network. Consumer entities 54A, 54B may include network elements of an access network, such as base stations, network functions in the core network, such as the Access and Mobility Function (AMF), Network Repository Function (NRF), etc., and/or applications within the access network or the core network. As illustrated in FIG. 3, NIR data is stored in the feature store 22 in tables 42A, 42B. Each table 42A, 42B includes one row per baseline object, with columns for features associated with the baseline object. Consumers 54A, 54B are deployed in respective pods 52A, 52B along with associated instances of NRT entities 20A, 20B and NRQ entities 50A, 50B. The consumers 54A, 54B may register/subscribe with the NRQ entity 50 to receive updates whenever a subscribed table is updated. In some embodiments, updates may be provided to the registered consumer upon request, and in other embodiments, the updates may be pushed to the registered consumer.

Any application that is using NRT/NRQ functionality can publish new columns (features) to the NRT 20 for inclusion in the feature store 22, where it can be available to other applications. To publish a new feature, the application can make use of the APIs available in the NRQ entity 50. When publishing a new feature, the NRT entity 20 may generate a timestamp and baseline object associated with the feature data. The NRT entity 20 may default to a current timestamp and use a baseline object selected by the application. The new feature will be added to a meta data store maintained by the NRT entity 20. The new feature can be accessed by other applications. In some embodiments, a feature can be identified based on the name of the publishing application and the new column/feature name.

When registering with the NRQ entity 50 to receive updates regarding NIR data, an application 54A,54B can decide whether to receive the new entries to the data in real-time or in batch mode. If real-time is selected, then whenever a new entry is added to one of the columns the application will be provided with newer version of data.

In some cases, applications using NRT/NRQ functionality may require historical data. Through its storage, the NRT entity 20 can retain historical data for all features for configured number of days. As the NRT entity 20 expects every column/feature to be linked to a date object, it can easily differentiate the entries made at different time points. This date object is used along with the baseline object as the unique key for identifying a row/record.

Applications can use the APIs available from the NRQ entity 50 and specify the time window for which the data is required. If data is absent for the requested period, an empty data frame will be returned. If data exists data is sent for all the features up to the time the data is queried.

Figure 4:
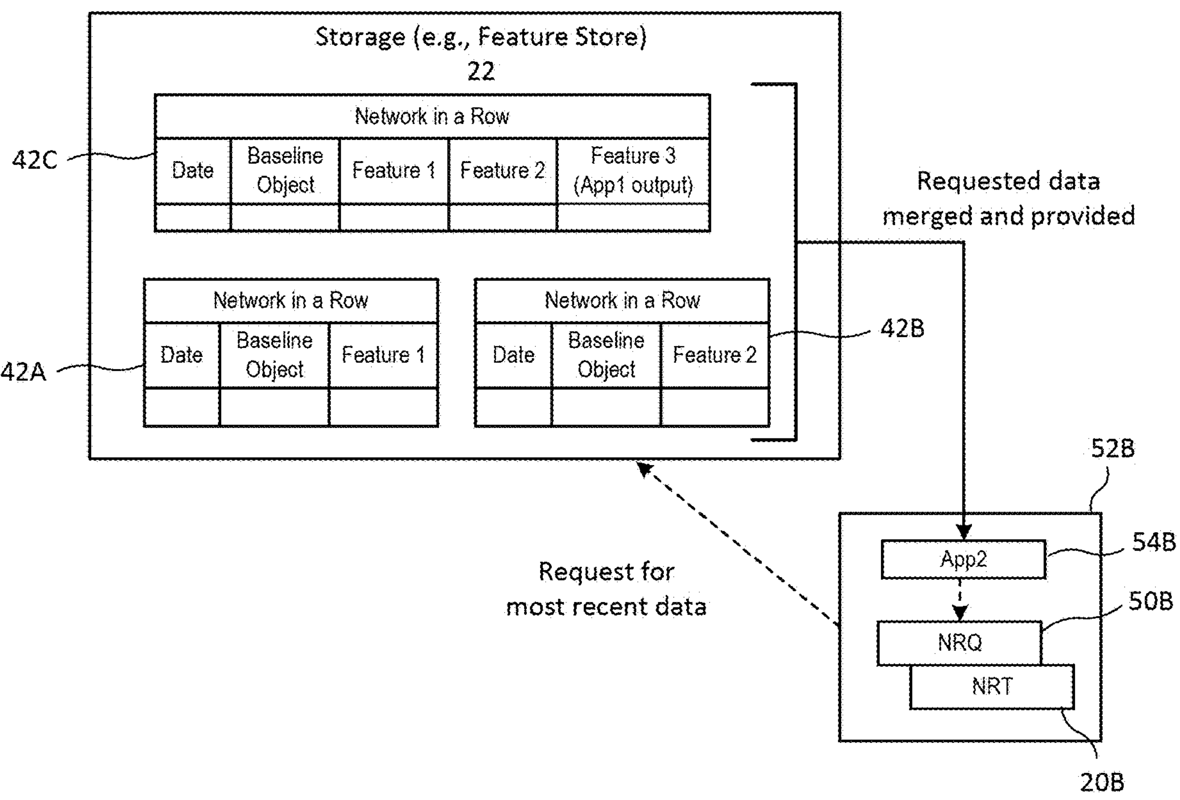
FIG. 4 is block diagram that illustrates that a consumer can request historical data from the feature store based on a specified time window.

FIG. 4 illustrates that a consumer 54B can request historical data from the feature store 22 based on a specified time window. Data from multiple tables corresponding to the same baseline object can be merged for the selected time window, and the merged data 42C provided to the consumer application. In the example shown in FIG. 4, some of the data (Feature 3) corresponds to a feature supplied by a separate application (App1).

In some embodiments, the NRT/NRQ entities 20, 50 may obtain and merge data from different domains. Data from external sources can also be added as features to the NIR data by the NRT entity 20. Associating the baseline object for the external source data is done by the NRT entity 20. The NRT entity 20 may use location-based algorithms and/or natural language processing algorithms to determine a closest baseline object associated with the external source data. Once the closest association is made, the NRT entity 20 stores external data as an additional feature along with date and baseline object. An external data source can be defined using the NRQ API.

The NRT/NRQ functionality can also provide a unified network view across domains. Data associated with different baseline objects can be merged by making use of network configurations (e.g.: Configuration Management information). The NRT entity makes use of a network configuration parameter (e.g.: 'reservedBy') to determine the referenced network object and reserved network object and thereby determine the hierarchy and the relationship. The NRT entity 20 can infer from configuration management data the mappings that can link together features spread across various domains, such as core, transport, and radio. The NRQ entity 50 can fetch the data and provide a singular view of the entire network that helps applications and AI/ML algorithms to infer the network.

Figure 5:
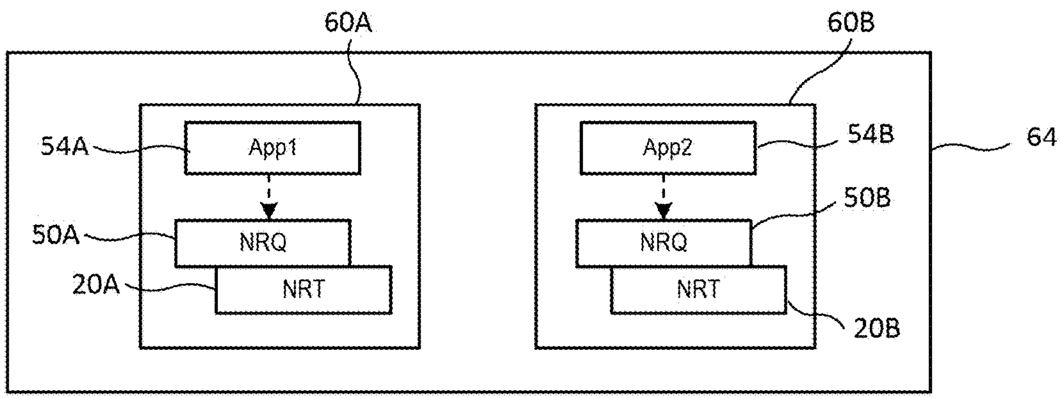
FIG. 5 is block diagram illustrates a cloud deployment option for the NRT entity and the NRQ entity.

FIG. 5 illustrates a cloud deployment option for the NRT entity 20 and the NRQ entity 50. In the deployment option illustrated in FIG. 5, the NRT and NRQ entities 20A/B, 50A/B are deployed within "sidecar" containers within a same pod 60A, 60B within a cloud computing environment 64 as the applications 54A, 54B (App1 and App2) that consume their services. Any application deployed in a cloud can utilize the NRT and NRQ functionality within a side car container upon demand. Applications attach or register to obtain NIR data through NRT and NRQ functionality.

As shown in the FIG. 5, NRT and NRQ entities 20, 50 may be available as sidecar containers inside the same pod 60A, 60B as the application container is deployed. The application 54A, 54B may make an internal call to the appropriate sidecar container which will in turn fetch the data and provide the transformed NIR data to the application as described below with respect to FIG. 13. In this deployment, the NRT and NRQ entities 20A/B, 50A/B are coupled with the underlying pod 60A/B which also hosts the application container. Every application deployed within the pod may access the NRT and NRQ functionality. The NRT and NRQ entities 20A/B, 50A/B are part of the life cycle of the same pod for other functionalities (e.g.: elastic scalability, security).

Figure 6A:
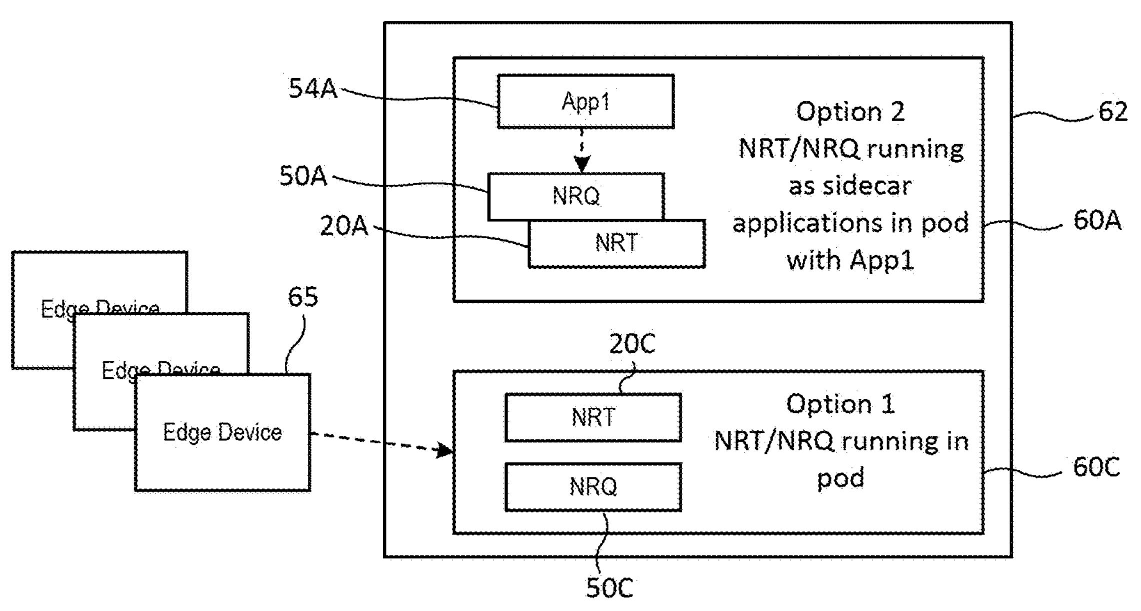
FIGS. 6A and 6B illustrate various options for deploying NRQ and NRT entities according to some embodiments.

Two options for near edge deployment for the NRT and NRQ entities 20, 50 are illustrated in FIG. 6A. As shown in the FIG. 6A, in a first option, the NRT and NRQ entities may be deployed in dedicated pods 60C separate from the consumer applications. In this approach, edge devices 65 may register with the NRQ and NRT entities 20C, 50C running in the dedicated pod 60C. In a second option, the NRT and NRQ entities 20A, 50A may be available as sidecar containers for the applications running in the same pod 60A in a near edge platform 62.

Applications running in far edge devices may need to access the NRT and NRQ functionality for AI/ML algorithms running at the edge devices. In the first option where the NRT and NRQ entities 20C, 50C are running in a dedicated pod 60C, edge devices 65 may subscribe or attach or register themselves for receiving the NIR data row through NRT and NRQ functionality. A dedicated pod 60C for NRT/NRQ has its own life cycle management based on the edge devices 65 registered to the NRT/NRQ entities. The NRT and NRQ containers may reside in a single pod 60C, and the edge devices 65 may request data directly from this pod 60C. The pods can also be scaled up or down as required. This option may be useful for resource constrained architectures where there is only room for device specific operations and no room for data transformation such as performed by the NRT entity.

For the second option, the NRT/NRQ functionality is available within sidecar containers inside the same pod 60A as the container for the application 54A is deployed at the near edge 62. The subscribed or registered application can make an internal call to the sidecar container, which will in turn fetch the data and provide the transformed NIR data to the application as described below in connection with FIG. 13. In this deployment, NRT and NRQ containers are coupled with the underlying pod which also hosts the application container. Each application deployed in the pod may access the NRT and NRQ functionality as a side car container. The NRT/NRQ functionality is part of the life cycle of the same pod for other functionalities (e.g.: elastic scalability, security). For example, FIG. 6A illustrates App1 with its own NRT and NRQ side car containers running in the same pod 60A. This option may be suitable for applications where the life cycle of NRT, NRQ is part of the same eco-system and should not be dependent on an external eco-system (e.g.: different pods).

Figure 6B:
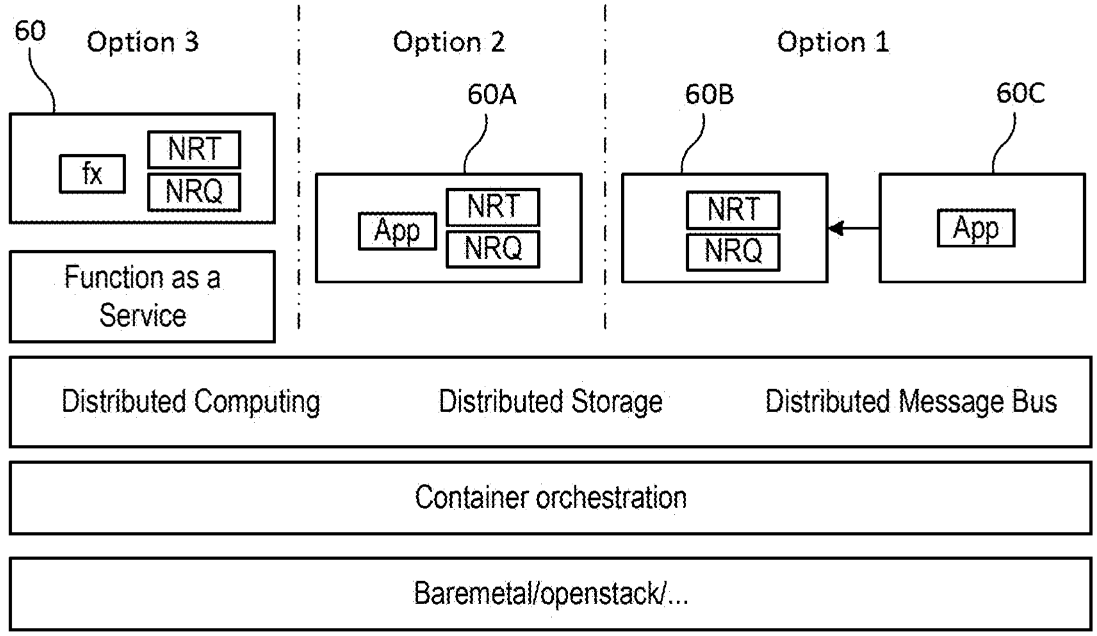

A further deployment option for the NRT entity 20 and NRQ entity 50 is illustrated in FIG. 6B as Option 3. In particular, the NRT and NRQ functionality may be made available to consumers as a function as a service (FaaS) function deployed in a serverless system. This option of deployment can be for both cloud and near edge platforms where functions are built with NRT and NRQ as additional functionalities are available with them.

Option 2 is also illustrated in FIG. 6B with NRT and NRQ functionality available as side-car containers with the consumer application within a common pod 60A. This option of deployment can be for both cloud and near edge platform applications.

Option 1 is also illustrated in FIG. 6B with the NRT and NRQ entities available within a separate pod 60B having its own scaling and security. This option may be preferable for edge devices, as they may be resource-constrained. Also, this option is available for near edge and cloud deployments as an alternative architecture where applications and functions want to use a common pod rather than having NRT and NRQ functionality provided as a side car container.

Each of the options described above may be implemented in a cloud computing environment with distributed computing, distributed storage and a distributed message bus. The cloud computing environment may utilize the functionality of a container orchestration layer that is built upon an openstack or baremetal layer.

NRT and NRQ functionality will now be described in more detail. In particular the NRT entity 20 may perform the following functions:

1) The NRT entity 20 parses the network data from native format using ELT or ETL architecture.
2) The NRT entity 20 performs the transformation from normalized table or graph data to AI/ML friendly format. (e.g.: tabular NIR data).
3) The NRT entity 20 stores the transformed data in storage (e.g.: feature store 22).

The NRQ entity 50 fetches the data from the feature store 22 and returns data to the applications. Also, when the data changes, the NRQ entity may notify the data to all registered applications, network functions and network elements.

In some embodiments, the NRT entity 20 can transform network data into AI/ML friendly format according to the following operations.

1) The NRT entity 20 parses the data according to the native format of the data (using ETL or ELT architecture). Example formats of the data are as follows:

Topology data—Network configuration management data may be stored in graph format. The NRT entity uses graph traversing algorithms on the graph format data that is available in an ASCII based file or graph databases and performs the transformations described below.

Historical data—Network performance data, configuration management data, alarm data, etc., may be stored in historical data warehouse in a format such as a columnar database. The data is normally stored in normalized format, such as master-child tables, for efficiency. The NRT entity may use native interfaces supported by the historical database, such as SQL or GraphQL, and perform the transformations described below.

Streaming data—A stream of events may be terminated at regular intervals (e.g., every 5 or 15 minute) depending on the configuration and supplied to a distributed message bus, such as a Kafka bus. A stream parsing application may consume events from the bus to generate counter files at each node level. For example a communication network the nodes may include base stations (eNodeB, gNodeB) or cells. The nodes are also referred as Managed Objects. The counter files are stored in a data warehouse database, such as a columnar distributed database. Each node (or Managed Object) in the data warehouse may have separate tables with it in which scalar and non-scalar data, such as arrays, structures, etc., is stored for further usage.

Trace files—Network data may be available in formats such as native binary format, XML and YAML format, etc. The NRT entity reads the binary files, parses the files XML, YAML files and performs the transformations described below APIs—Telecommunications applications provide APIs, such as Serviceability, that provide a common interface to telecommunication data. The NRT entity consumes the data using the APIs and performs the transformations described below.

2) The NRT entity 20 performs the following transformations:

Step A. Identify baseline object, from network configuration data. (e.g.: eNodeB or Cell or Beam or "based on parametric criteria level"). The baseline object is created with a timestamp.

Figure 7:
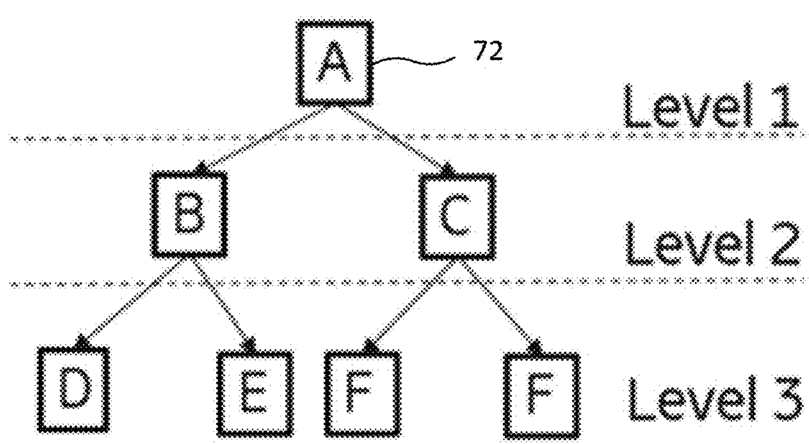
FIG. 7 illustrates an example of a hierarchical topology graph.

An example of a hierarchical topology graph shown is in FIG. 7. In the topology graph of FIG. 7, nodes 72 are arranged in hierarchical levels (e.g., Level 1, 2 and 3). Associations between nodes 72 are shown as arrows. Any of the nodes 72 can be considered to be a baseline object for purposes of NIR data transformation. If an object in a higher level is selected as the baseline object (e.g.: node A in Level 1), then all of the lower-level objects in multiple child rows are transformed into columns for the level 1 object, node A. When a lower-level object (e.g.: node B) is selected as a baseline object, columns of parent objects are duplicated for the lower-level objects. For example, when node B is selected as the baseline object, columns of node A are duplicated for node B.

Step B. All the parameters of baseline objects are retained as individual columns and the NIR data is referred to as the "baseline table."

Step C. If the columns are non-scalar (e.g.: arrays, structures) an expansion procedure is performed in which then the columns are parsed and every individual item is converted to a separate column with column heading as parameter_name_n (where n is a running number from 1 . . . N). If there are 10 elements in the array, then 10 columns are created with parameter_name_1 to parameter_name_10.

Step D. Parse every object in the network data. The NRT entity 20 checks the cardinality relation with the base object as follows. For objects with one-to-one relation, all the parameters of the object are mapped to the baseline table. For the columns of the object that are non-scalar, an expansion procedure as described above is performed.

For objects with a one-to-N relation, each row of the object is added as an additional column to the baseline table. For the columns of the object that are non-scalar, an expansion procedure as described above is performed. For example, if there are 10 rows with 10 parameters, then 100 columns are added to the base table. For the columns of the object that are non-scalar type, an expansion procedure as described above is performed.

Figure 8:
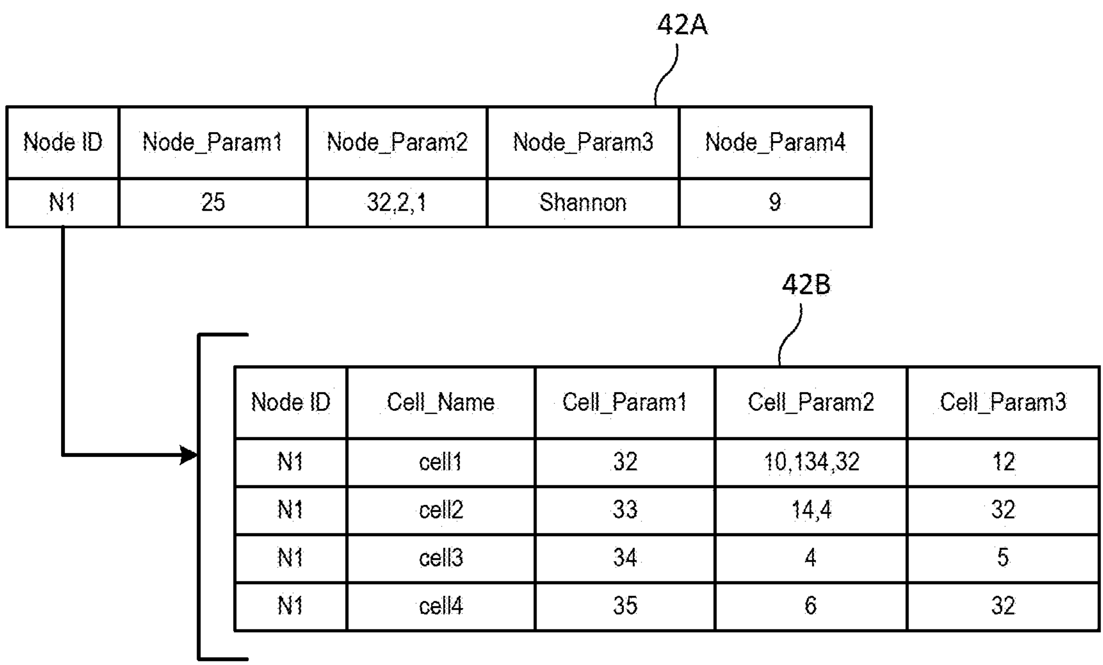
FIG. 8 illustrates an example of NIR tables representing a node-cell relationship.

FIG. 8 illustrates an example of NIR tables 42A, 42B representing a node-cell relationship. In particular, a node and cell relation is shown in tables 42A, 42B. In this example, a single node (Node ID=N1) has four associated cells (cell1 to cel14). The tables 42A, 42B include scalar parameters (e.g.: node_param1) and non-scalar parameters. (e.g.: cell_param2, node_param2). Table 42A is a table of nodes with each row corresponding to a node. Table 42B is a table of cells with each row corresponding to a cell. The entry of Table 42A for node N1 is shown, and the entries of Table 42B are shown for cells associated with node N1.

Figure 9:
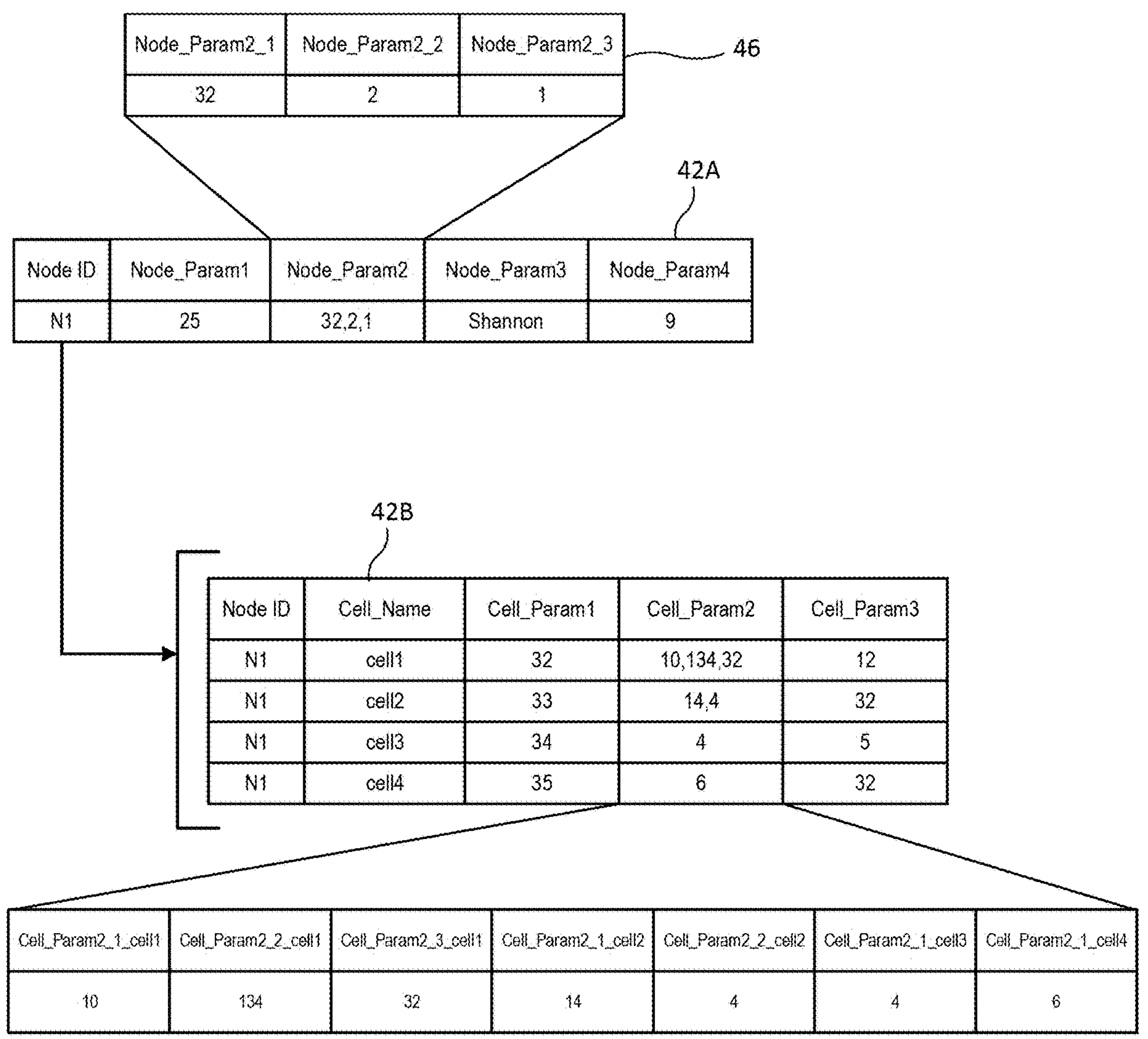
FIG. 9 illustrates the expansion of non-scalar parameters into multiple cells of NIR data.

To transform the tables 42A, 42B to NIR data, transformations are needed for non-scalar parameters (e.g.: Node_Param2, Cell_Param2) when "Node" is identified as baseline object. A transformation according to some embodiments is illustrated in FIGS. 9 and 10. FIG. 9 illustrates that the non-scalar parameter Node_Param2 of Table 42A can be expanded into multiple cells 46. Likewise, the non-scalar parameters Cell_Param2 of Table 42B can be expanded into multiple cells. Each expanded parameter may become a new column of a transformed NIR table 48 shown in FIG. 10, which is a row of a NIR table for baseline object "node" with Node ID=N1.

Accordingly, FIG. 10 shows how the transformed NIR data looks when the baseline object is at node level. Node-cell data is transformed to a single row (according to the number of nodes, in this example only one node—so there is one row). This transformation can be achieved using an SQL-like generic API or a parsing, transformation function.

Figure 11:
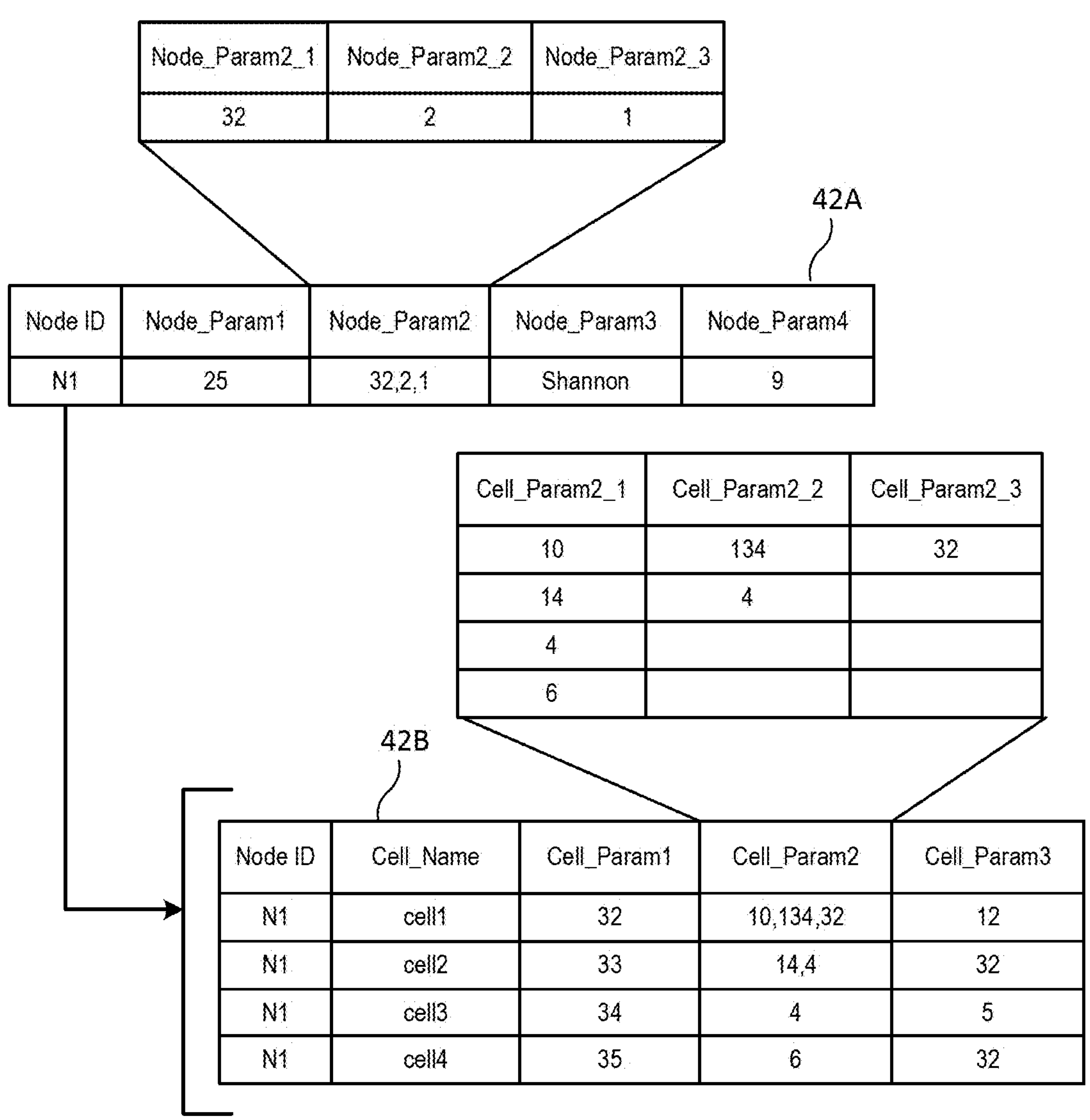
FIG. 11 illustrates a node and cell relation with transformation needed for non-scalar parameters.
Figure 12:
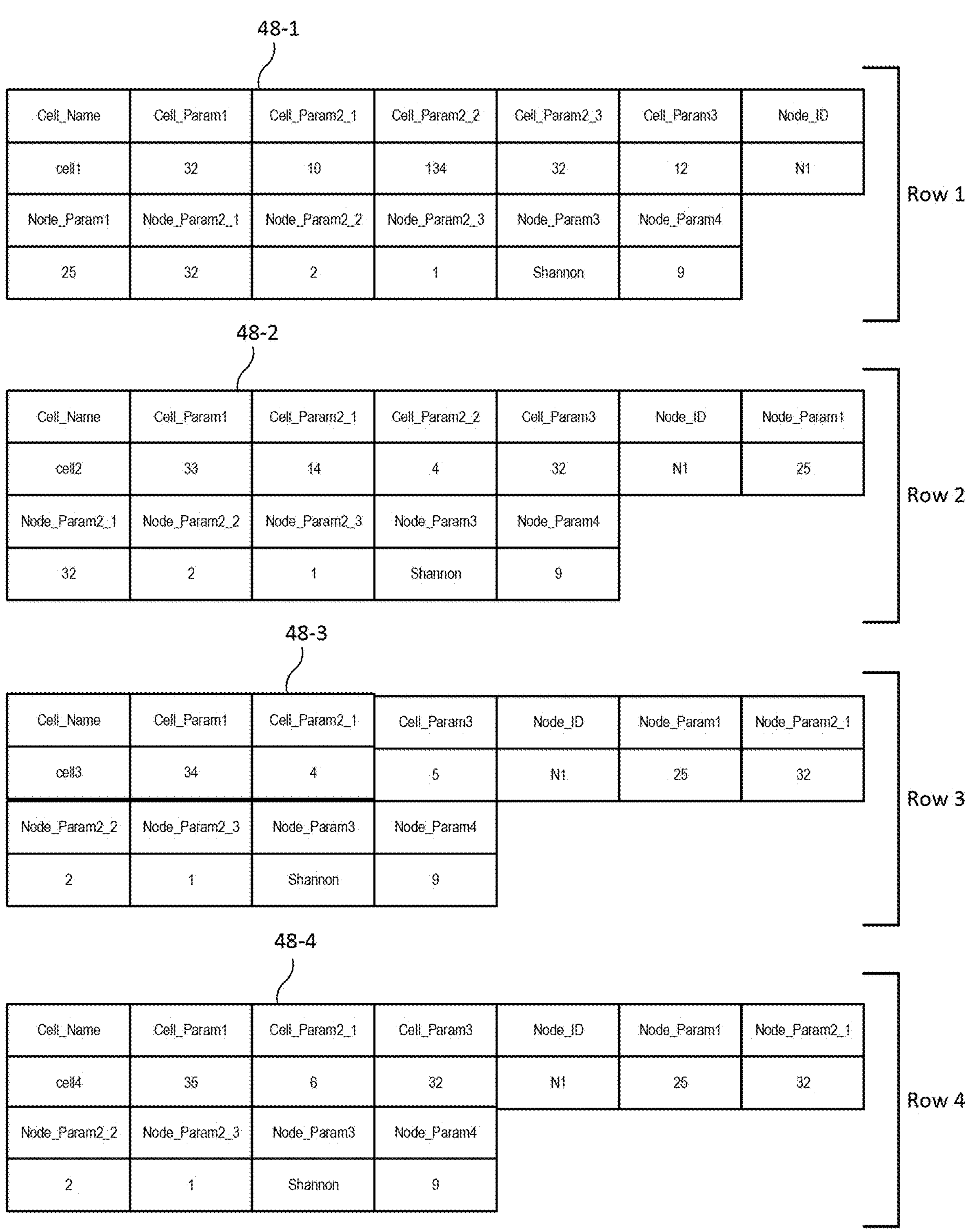
FIG. 12 shows how the transformed NIR data looks according to an example, when the baseline object is at cell level.

A similar approach may be taken when "cell" is identified as the baseline object. For example, referring to FIG. 11, a node and cell relation is shown with transformation needed for non-scalar parameters (e.g.: Node_Param2, Cell_Param2, Cell_Param3) when "cell" is identified as baseline object. FIG. 12 illustrates the transformed NIR rows 48-1 to 48-4 corresponding to cells cell1 to cell4. FIG. 12 shows how the transformed NIR data looks when the baseline object is at cell level. Node-cell data is transformed to multiple rows based on the number of cells.

The transformation described above are performed by the NRT entity 20 for each object. The data is stored in the feature store 22 in NIR format with a timestamp. The data can be stored in domains associated with different networks or network subsets (e.g.: Core, Transport, RAN).

When there are changes to network data (e.g.: CM, PM, and Alarms) overtime, the NRT entity 20 may process only the subset of data that has changed and can store the changed data in the feature store 22.

Figure 13:
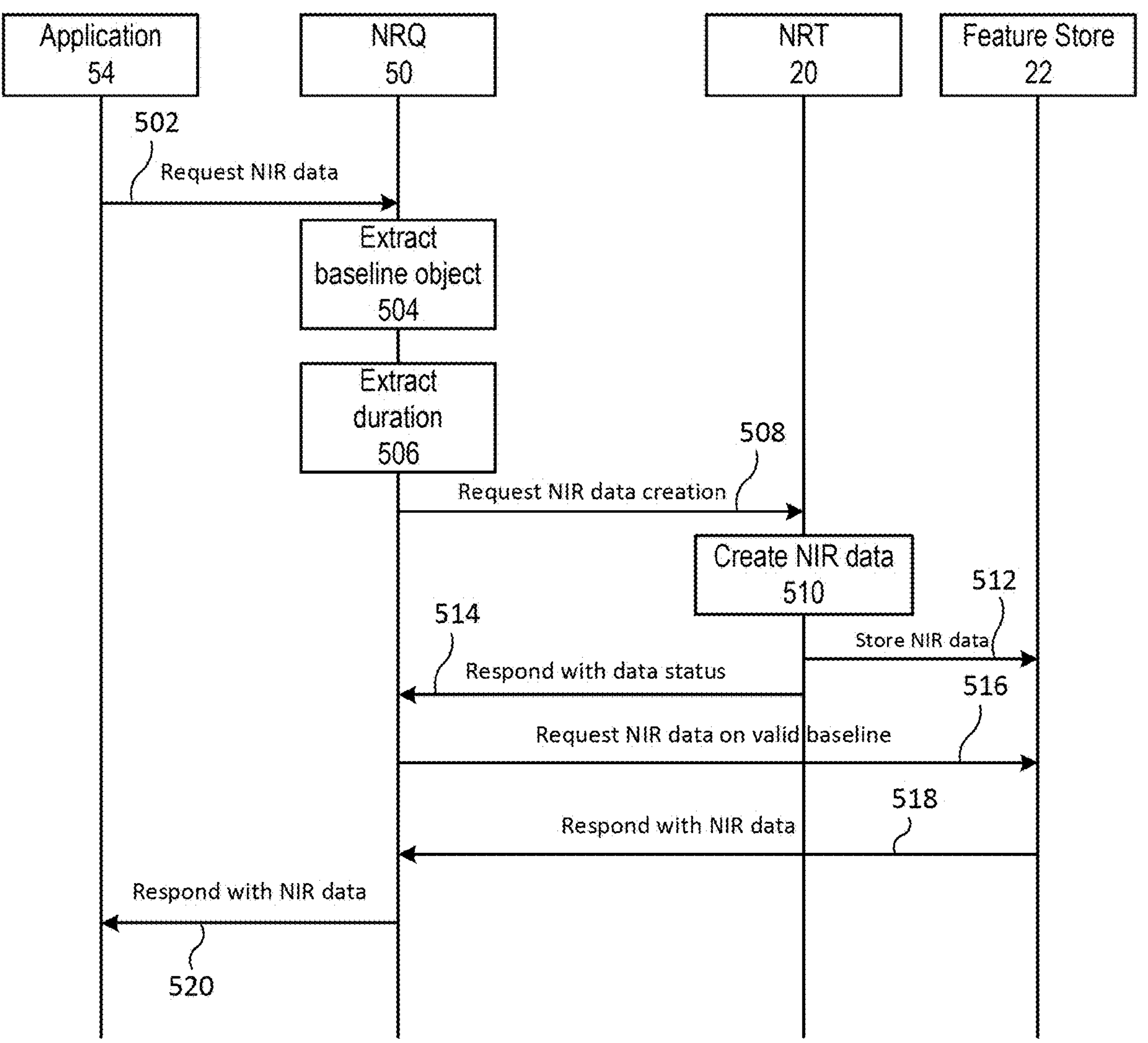
FIG. 13 illustrates operations of the NRT entity and NRQ entity according to some embodiments.

FIG. 13 illustrates operations of the NRT entity 20 and NRQ entity 50 according to some embodiments. An application 54, which may include an AI/ML model, accesses the data from the feature store 22 via the NRQ entity 50. For example, an AI/ML model may access the NIR data for training and inference purposes. As shown in FIG. 13, the application 54 sends a request 502 to the NRQ entity 50 to access NIR data.

The NRQ entity 50 receives the request 502 which includes a query for NIR data. The query may specify a baseline object level and can additionally specify a duration parameter for the data. Based on the duration parameter, the NRQ entity 50 will assemble the NIR data at the specified baseline level and provide the final data back to the application. To accomplish this, the NRQ entity 50 first extracts the baseline object from the query (block 504) and extracts the duration from the query (if present). For example, the NRQ entity 50 may fetch start and end parameters ("from time" and "to time"). If a duration or time is not specified in query, the NRQ entity 50 may use a default option of providing only the latest data for all features.

The NRQ entity 50 searches the feature store 22 for the baseline level data, if the data is available proceeds to request the NIR data from the feature store 22 with a request 516.

However, if the baseline level data is not available, then the NRQ entity 50 determines whether the baseline object is valid (from metadata or topology information data) and sends a request 508 to the NRT entity 20 to create the baseline data. The NRT 510 creates the NIR data for the valid baseline object at block 510 and stores the NIR data in the feature store 22 at arrow 512.

The NRT entity 20 then responds with a data states 514 indicating that the new NIR data is available.

If the baseline object is not valid, then the NRQ entity 50 returns an error message to the application 54. If a baseline object is not specified in the query, then the NRQ entity 50 may return an error message requesting the user to specify the baseline object.

At arrow 516, the NRQ entity 50 fetches the requested data from the feature store 22, and the feature store returns the data at arrow 518. The data may be fetched for one or more specified domains (e.g.: Core, transport, RAN) according to the specified duration. The NRQ entity 50 may further combine the NIR data for individual baseline levels.

The NRQ entity 50 then returns the requested data as NIR data to the application 54 according to the specified baseline level (e.g.: node or cell) at arrow 520.

Figure 14:
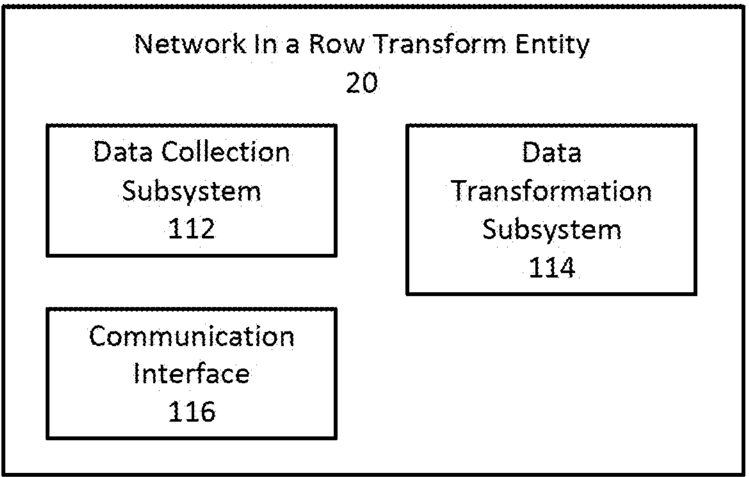
FIG. 14 is a functional block diagram of an NRT entity according to some embodiments.

FIG. 14 is a functional block diagram of an NRT entity 20 according to some embodiments. In particular, the NRT entity 20 may include a communication interface 116 for communicating with network elements including applications and network functions for collecting network data and for communicating with a feature store 22. The NRT entity 20 may further include a data collection subsystem 112 that collects heterogeneous data from various network sources and a data transformation subsystem 114 that transforms the data into NIR format as described above.

FIG. 15A is a block diagram of a NRT entity 20 according to some embodiments. Various embodiments provide a NRT entity 20 that includes a processor circuit 134 a communication interface 118 coupled to the processor circuit 134, and a memory 136 coupled to the processor circuit 134. The processor circuit 134 may be a single processor or may comprise a multi-processor system. In some embodiments the NRT entity may be implemented as a physical device and in alternative embodiments the NRT entity may be implemented such that processing may be performed by multiple different systems that share processing power, such as in a distributed or cloud computing system. The memory 136 includes machine-readable computer program instructions that, when executed by the processor circuit, cause the processor circuit to perform some of the operations and/or implement the functions depicted described herein.

As shown, a NRT entity 20 includes a communication interface 118 (also referred to as a network interface) configured to provide communications with other devices. The NRT entity 20 also includes a processor circuit 134 (also referred to as a processor) and a memory circuit 136 (also referred to as memory) coupled to the processor circuit 134. According to other embodiments, processor circuit 134 may be defined to include memory so that a separate memory circuit is not required.

As discussed herein, operations of the NRT entity 20 may be performed by processing circuit 134 and/or communication interface 118. For example, the processing circuit 134 may control the communication interface 118 to transmit communications through the communication interface 118 to one or more other devices and/or to receive communications through network interface from one or more other devices. Moreover, modules may be stored in memory 136, and these modules may provide instructions so that when instructions of a module are executed by processing circuit 134, processing circuit 134 performs respective operations (e.g., operations discussed herein with respect to example embodiments.

FIG. 15B illustrates various functional modules that may be stored in the memory 136 of the NRT entity 20. The modules may include a data collection module 122 that implements the data collection subsystem 112 shown in FIG. 14 to collect heterogeneous data from various network sources and a data transformation module 124 that implements the data transformation subsystem 114 shown in FIG. 14 to transform the data into NIR format as described above.

FIG. 16A is a block diagram of a NRQ entity 50 according to some embodiments. Various embodiments provide a NRQ entity 50 that includes a processor circuit 234*a* communication interface 218 coupled to the processor circuit 234, and a memory 236 coupled to the processor circuit 234. The processor circuit 234 may be a single processor or may comprise a multi-processor system. In some embodiments the NRQ entity may be implemented as a physical device and in alternative embodiments the NRQ entity may be implemented such that processing may be performed by multiple different systems that share processing power, such as in a distributed or cloud computing system. The memory 236 includes machine-readable computer program instructions that, when executed by the processor circuit, cause the processor circuit to perform some of the operations and/or implement the functions depicted described herein.

As shown, a NRQ entity 50 includes a communication interface 218 (also referred to as a network interface) configured to provide communications with other devices. The knowledge base interface system 200 also includes a processor circuit 234 (also referred to as a processor) and a memory circuit 236 (also referred to as memory) coupled to the processor circuit 234. According to other embodiments, processor circuit 234 may be defined to include memory so that a separate memory circuit is not required.

As discussed herein, operations of the NRQ entity 50 may be performed by processing circuit 234 and/or communication interface 218. For example, the processing circuit 234 may control the communication interface 218 to transmit communications through the communication interface 218 to one or more other devices and/or to receive communications through network interface from one or more other devices. Moreover, modules may be stored in memory 236, and these modules may provide instructions so that when instructions of a module are executed by processing circuit 234, processing circuit 234 performs respective operations (e.g., operations discussed herein with respect to example embodiments.

FIG. 16B illustrates various functional modules that may be stored in the memory 236 of the NRQ entity 50. The modules may include a query processing module 222 that processes queries from consumer applications for NIR data and a data retrieval module 224 that retrieves NIR data from a feature store 22 as described above.

As described herein, NRT and NRQ are network functions that can be deployed at far edge, near edge or centralized data centers according to the latency need of the overall use case. The NRT and NRQ functions operate to share network data across applications in an AI/ML friendly format.

The NRT and NRQ functions can, for example, provide data needed for 3GPP network data analytics function (NWDAF).

By employing the NRT and NRQ functionality described herein, data produced by one application can be made available for other applications within the network ecosystem in a NIR format that is suitable for use by AI/ML applications. The NIR data may be stored in a feature store that is accessible by other applications that use AI/ML algorithms. Performing the NIR transformation in a central entity may avoid having to duplicate the data transformation operations across multiple network functions. Moreover, duplication of data storage and transformation may be avoided by persisting only the changed values once a baseline table has been created.

As described above, the NRT and NRQ functionality may be available in side car containers or in dedicated pods. The NRT and NRQ functionality may additionally be provided as FaaS functions that natively help applications and other functions to consume the NIR data.

Baseline approaches described herein allow network related data to be defined relative to a specific baseline, such as cell level or node level. In some embodiments, the NIR data may be organized based on parametric criteria, such as beam level or congested traffic level.

Transformation methods described herein help to transform heterogeneous data formats to NIR data by transforming scalar and non-scalar data according to different baseline objects.

Figure 17:
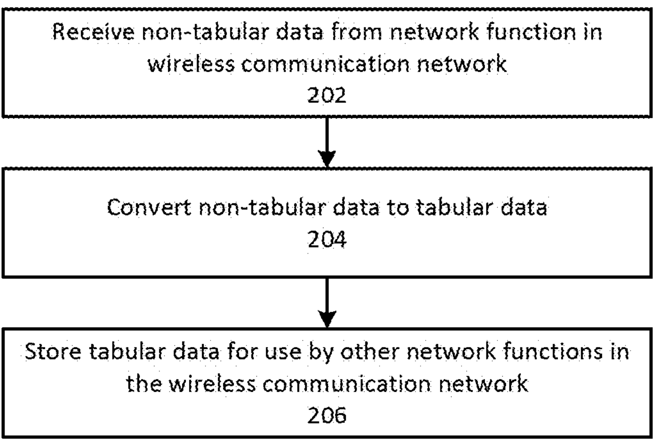
FIG. 17 is a flowchart that illustrates operations of an NRT entity according to some embodiments.

FIG. 17 is a flowchart that illustrates operations of a NRT entity 20 according to some embodiments. Referring to FIG. 17, a method by a network function of a wireless communication system includes receiving (202) structured non-tabular data relating to the wireless communication system, wherein the structured non-tabular data includes network topology data in graph format. The structured non-tabular data is converted (204) into tabular data. Converting the structured non-tabular data into tabular data includes identifying a baseline object of a graph of the network topology data and generating a row of tabular data for each baseline object in the graph of the network topology data. The method further includes storing (206) the tabular data in a data store for access by consumer applications in the wireless communication system.

In some embodiments, converting the structured non-tabular data into tabular data includes converting the structured non-tabular data into flat tabular data.

In some embodiments, the structured non-tabular data is received in a native data format, and wherein the method further includes parsing the structured non-tabular data in the native data format. Parsing the structured non-tabular data may include parsing the structured non-tabular data using an extract, transform and load architecture. In some embodiments, parsing the structured non-tabular data includes parsing the structured non-tabular data using an extract, load and transform architecture.

The structured non-tabular data may include at least one of network topology data, historical data, streaming data, trace file data and application programming interface, API, data.

The method may further include identifying parameters of the baseline objects, identifying related objects associated with the baseline objects, and identifying parameters of the related objects. The parameters of the baseline object and the parameters of the related objects may be included as columns of the tabular data in rows associated with the baseline objects.

The method may further include identifying vector parameters of the baseline objects and related objects, and expanding the vector parameters into a plurality of scalar parameters, wherein the scalar parameters are included as columns of the tabular data in rows associated with the baseline objects.

The network function may be deployed together with the consumer application within a virtual container. In some embodiments, the network function may be deployed as a function-as-a-service that is accessible by the consumer application. In some embodiments, the network function is deployed as a network edge function in the wireless communication system. In particular, the network function may be deployed in a base station of the wireless communication system.

The structured non-tabular data may include first structured non-tabular data and the tabular data may include first tabular data, and the method may further include receiving second structured non-tabular data from a third network function, converting the second structured non-tabular data into second tabular data, and storing the second tabular data in the data store as combined data with the first tabular data.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

LIST OF ABBREVIATIONS

Abbreviation Explanation

AI Artificial Intelligence
AMF Access and Mobility Function
API Application Programming Interface
CM Configuration Management
ETL Extract, Transform and Load
ELT Extract, Load and Transform FaaS Function as a Service
FM Fault Management
LTE Long Term Evolution
ML Machine Learning
NRF Network Repository Function
PM Performance Management
SMO Service Management and Orchestration
SQL Structured Query Language
NIR Network in a Row
NRT Network in a Row Transformer
NRQ Network in a Row Query Engine
XML Extensible Markup Language
YAML Yet Another Markup Language

The invention claimed is:

1. A method by a network function of a wireless communication system, comprising:

receiving structured non-tabular data relating to the wireless communication system, wherein the structured non-tabular data comprises network topology data in graph format;

converting the structured non-tabular data into tabular data, wherein converting the structured non-tabular data into tabular data comprises traversing a graph of the network topology data to identify a baseline object of the graph of the network topology data and generating a row of tabular data for each baseline object in the graph of the network topology data; and storing the tabular data in a data store for access by a consumer application in the wireless communication system.

2. The method of claim 1, wherein converting the structured non-tabular data into tabular data comprises converting the structured non-tabular data into flat tabular data.

3. The method of claim 1, wherein the structured non-tabular data is received in a native data format, and wherein the method further comprises parsing the structured non-tabular data in the native data format.

4. The method of claim 3, wherein parsing the structured non-tabular data comprises parsing the structured non-tabular data using an extract, transform and load architecture.

5. The method of claim 3, wherein parsing the structured non-tabular data comprises parsing the structured non-tabular data using an extract, load and transform architecture.

6. The method of claim 1, wherein the structured non-tabular data comprises at least one of network topology data, historical data, streaming data, trace file data and application programming interface, API, data.

7. The method of claim 1, further comprising:

identifying parameters of the baseline objects;

identifying related objects associated with the baseline objects; and identifying parameters of the related objects;

wherein the parameters of the baseline object and the parameters of the related objects are included as columns of the tabular data in rows associated with the baseline objects.

8. The method of claim 7, further comprising:

identifying vector parameters of the baseline objects and related objects; and expanding the vector parameters into a plurality of scalar parameters, wherein the scalar parameters are included as columns of the tabular data in rows associated with the baseline objects.

9. The method of claim 1, wherein the network function is deployed together with the consumer application within a virtual container.

10. The method of claim 1, wherein the network function is deployed as a function-as-a-service that is accessible by the consumer application.

11. The method of claim 1, wherein the network function is deployed as a network edge function in the wireless communication system.

12. The method of claim 11, wherein the network function is deployed in a base station of the wireless communication system.

13. The method of claim 1, wherein the structured non-tabular data comprises first structured non-tabular data and the tabular data comprises first tabular data, the method further comprising:

receiving second structured non-tabular data from a third network function;

converting the second structured non-tabular data into second tabular data; and storing the second tabular data in the data store as combined data with the first tabular data.

14. A network in a row transform, NRT, entity, comprising:

a communication interface;

a processing circuit; and a memory that stores computer program instructions that, when executed by the processing circuit, cause the NRT entity to perform operations comprising:

receiving structured non-tabular data relating to a wireless communication system, wherein the structured non-tabular data comprises network topology data in graph format;

converting the structured non-tabular data into tabular data, wherein converting the structured non-tabular data into tabular data comprises traversing a graph of the network topology data to identify a baseline object of the graph of the network topology data and generating a row of tabular data for each baseline object in the graph of the network topology data; and storing the tabular data in a data store for access by a consumer application in the wireless communication system.

15. The NRT entity of claim 14, wherein converting the structured non-tabular data into tabular data comprises converting the structured non-tabular data into flat tabular data.

16. The NRT entity of claim 14, wherein the structured non-tabular data is received in a native data format, and wherein the operations performed by the NRT entity further comprise parsing the structured non-tabular data in the native data format.

17. The NRT entity of claim 16, wherein parsing the structured non-tabular data comprises parsing the structured non-tabular data using an extract, transform and load architecture.

18. The NRT entity of claim 16, wherein parsing the structured non-tabular data comprises parsing the structured non-tabular data using an extract, load and transform architecture.

19. The NRT entity of claim 14, wherein the structured non-tabular data comprises at least one of network topology data, historical data, streaming data, trace file data and application programming interface, API, data.

20. The NRT entity of claim 14, wherein the operations performed by the NRT entity further comprise:

identifying parameters of the baseline objects;

identifying related objects associated with the baseline objects; and identifying parameters of the related objects;

wherein the parameters of the baseline object and the parameters of the related objects are included as columns of the tabular data in rows associated with the baseline objects.

21. A computer program product comprising a non-transitory storage medium containing computer program instructions that, when executed by one or more processors of a computing device cause the computing device to perform operations comprising:

receiving structured non-tabular data relating to a wireless communication system, wherein the structured non-tabular data comprises network topology data in graph format;

converting the structured non-tabular data into tabular data, wherein converting the structured non-tabular data into tabular data comprises traversing a graph of the network topology data to identify a baseline object of the graph of the network topology data and generating a row of tabular data for each baseline object in the graph of the network topology data; and storing the tabular data in a data store for access by a consumer application in the wireless communication system.

* * * * *